No. 609,153. Patented Aug. 16, 1898.
C. W. LEVALLEY.
DRIVE CHAIN.
(Application filed Feb. 15, 1896.)
(Model.) 2 Sheets—Sheet 1.

Witnesses:
J. B. McGirr.
J. P. Appleman.

Inventor:
Christopher W Levalley
G. H. H. Doubleday atty.

No. 609,153. Patented Aug. 16, 1898.
C. W. LEVALLEY.
DRIVE CHAIN.
(Application filed Feb. 15, 1896.)

(Model.) 2 Sheets—Sheet 2.

Witnesses:

Inventor:
Christopher W. Levalley

UNITED STATES PATENT OFFICE.

CHRISTOPHER W. LEVALLEY, OF MILWAUKEE, WISCONSIN.

DRIVE-CHAIN.

SPECIFICATION forming part of Letters Patent No. 609,153, dated August 16, 1898.

Application filed February 15, 1896. Serial No. 579,376. (Model.)

*To all whom it may concern:*

Be it known that I, CHRISTOPHER W. LE-VALLEY, a citizen of the United States, residing at Milwaukee, in the county of Milwaukee and State of Wisconsin, have invented certain new and useful Improvements in Drive-Chains, of which the following is a specification, reference being had therein to the accompanying drawings.

Figure 1:
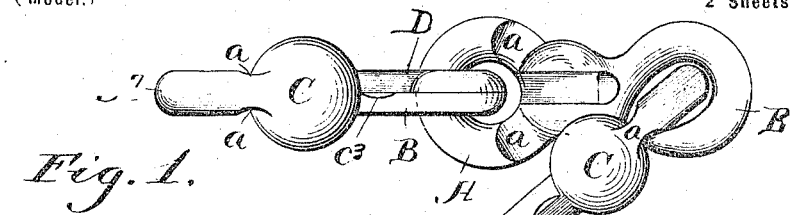
Figure 2:
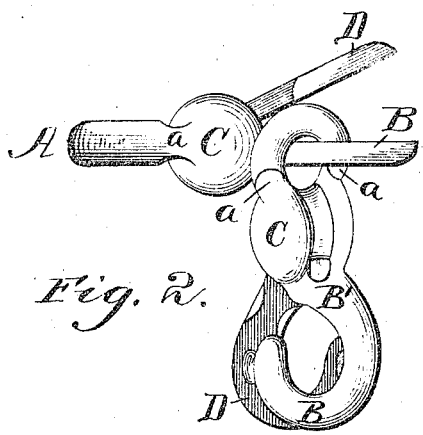
Figure 3:
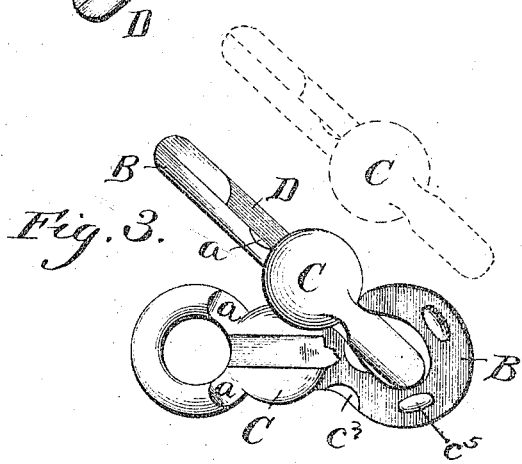
Figure 4:
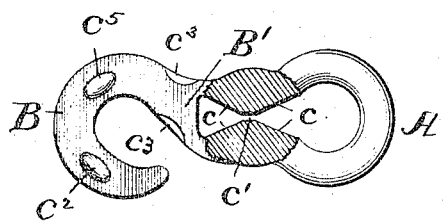
Figure 5:
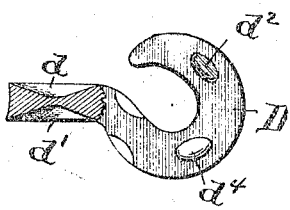
Figure 6:
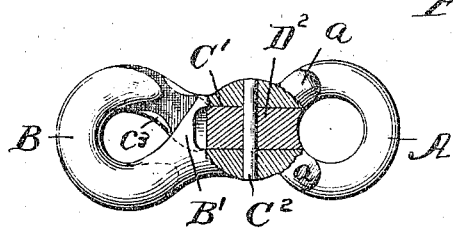
Figure 7:
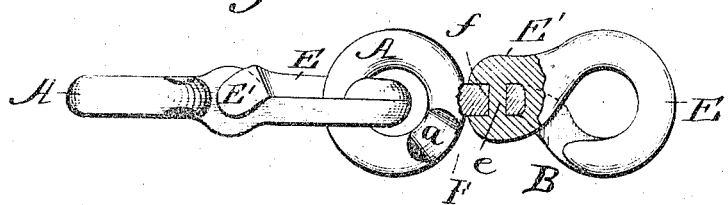
Figure 8:
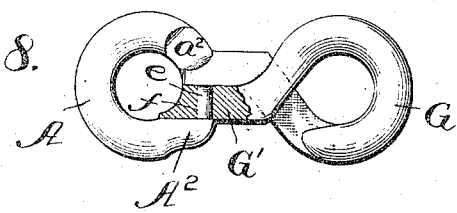

Figure 1 is a side view of my improved chain, the right-hand link being in position for opening the movable hook of the middle link. Fig. 2 shows the movable hook opened. Fig. 3 shows the same two links in position for removing the eye of one of them from the rigid hook of the other, the dotted lines indicating its position after uncoupling. Fig. 4 is a side view, partly in section, of one member of the duplicate links. Fig. 5 is a detached view of the other member of the link, the member shown in Fig. 4 having been cut apart, so as to release the one shown in Fig. 5. Fig. 6 is a modification of my invention, in which the movable hook is connected to the other member by means of a separate pintle. Fig. 7 is a side view of another modification, partly broken away, to show the manner of pivoting the movable hook to the other member of the link. Fig. 8 is another modification, also partly broken away.

Similar reference-letters indicate like parts in all the figures.

The object of one part of my invention is to produce a drive-chain adapted to run upon a grooved sheave or upon a series of forked sprockets and the links of which shall be capable of being coupled and uncoupled only when they are placed in unusual positions, such as they will not be liable to assume when in actual operation.

To this end one novel feature relates to the construction of a chain-link which has at one end an eye or loop and at its opposite end an open hook, these parts being integral, in combination with a movable hook.

Another part of my invention relates to the construction of a chain-link which has at one end a closed eye or loop and at its opposite end a movable hook which is cast thereon with a swiveled connection between these two parts.

Other parts of the invention will be more particularly pointed out in the claims.

Referring to Figs. 1 to 6, A is an eye or loop, preferably ring-like in its general form, with one or more reduced parts $a$ $a$.

I prefer to provide the loop with similar reduced parts or notches upon both sides of the same portion, as indicated in Figs. 1 and 2, in order to provide for a narrow throat in the hook without weakening the said loop or eye so much as would result from cutting a single notch wholly in one side thereof, and under some circumstances I propose to form similar notches upon the opposite side of the eye, as is indicated in Fig. 6, to facilitate assembling or uncoupling the links in a reversed position from that shown in Fig. 1.

B is a hook cast integral with the eye, the base of the hook being connected with the eye by means of an intermediate section $C$ $c$ $C$ $c$, of which the two portions $C$ $C$ are preferably circular or disk-like expansions with cone-shaped inner faces $c$ $c$, whose apices approach each other quite closely, leaving a narrow throat $c'$ between them. One side of the hook B is practically flat and lies in a plane which includes the axes of the cone-shaped parts $c$ $c$, for a purpose which will be hereinafter explained. The flat face of the hook has one or more recesses $c^2$, and, by preference, a notch $c^3$ or notches $c^3$ $c^3$ near its base. This hook has also a projection or bead $c^5$ on its flat face.

The base $B'$ of the hook connects intermediate sections $C$ $c$, and thus supports them firmly against any tendency to spread when under tension.

D D' is the movable hook. It is produced by casting into the desired shape and position relative to the other previously-formed parts of the link by any of the well-known methods of casting one part into or upon another.

As indicated in section in Fig. 5, opposite sides of the part D' are dishing and fit closely the apices $c$ $c$, as at $d$ $d'$, which constitute substantially pivot-points about which the movable hook swings, and which also support said hook against any endwise pull to which it may be subjected in actual use, the pivot-points lying in the plane of the flat inner face of the hook, so that the flat faces can close against each other.

The inner face of hook D D' has a recess $d^2$ and a bead $d^4$ which when the parts are in working position interlock with the corresponding parts of the rigid hook, whereby the body of one hook supports the point of the other hook against being pulled out of shape. Thus each hook assists in maintaining the original conformation of the other hook, a result which contributes materially to preserving a uniformity in the preestablished length of the chain under tension, which is important.

The pull upon each hook tends to bend its point or lip outward and the opposite portion of its body inward; but these tendencies are resisted and neutralized by the interlocking devices which connect each of those portions of each hook with the oppositely-acting portion of the other hook in the same link, these mutual coöperations being made possible by the point of one hook lying adjacent to the body of the other hook of the link.

Of course the firm grip of the interlocking devices is contributed to by the close fitting of the inner walls of the eye of the next link of the chain against the outer faces of each pair of hooks.

When two links are in about the position indicated at the right-hand end of Fig. 1, the movable hook can be opened out, its point passing through one of the notches or reduced portions $a$ of the eye of the other link. Then by placing the same eye in about the position indicated in Fig. 3 the point of the rigid hook can be passed through a notch $a$ and the links separated. (See dotted lines in that figure.)

Of course the links are assembled into a chain by substantially the reverse mode of manipulation of the parts.

Under ordinary conditions the shrinkage of the metal of the movable hook will insure sufficient freedom of movement of said hook about its pivotal point.

In the modification shown in Fig. 6 the pivoted end $D^2$ of the movable hook has parallel flat sides to facilitate its insertion into the throat $C'$ between the intermediate sections $C c$, which has corresponding flat and parallel sides with a pivot $c^2$, about which the hook D D' swings, the general construction of this hook, including its interlocking devices, being like that of the movable hook of the prior-described figures.

In the modification shown in Fig. 7 movable hook E has its shank E' forked to straddle the intermediate section F, which connects the rigid hook B with the eye A, and is made with a seat $f$, into which the metal runs when the movable hook is cast, thus forming a pintle $e$, which is integral with the rest of the said movable hook.

Hook E is provided with interlocking devices adapted to engage with those of hook B of Fig. 7, and these last-mentioned hooks fit somewhat closely within the eye of the next link of the chain.

It will be observed that in Fig. 7 the pintle $e$ extends entirely through the seat $f$, so that the hooks B E cannot be separated except by tearing the metal asunder, and that the extensive bearing-surface of the articulating parts insures great durability of the chain.

In Fig. 8 the eye A is the same as in the previously-described figures, except that it is somewhat elongated at $A^2$, where it is round in cross-section to serve as a pintle or pivot for the movable hook G G', of which the body part G' is cast upon and around the said pintle, the bodies of both hooks being long enough to make the entire link of the same total length as are the previously-described links in order that they shall run on the same kind of sprocket-wheels. The eye has a reduced part or notch at $a^2$ to pass through the hooks for coupling.

By an examination of the drawings it will be seen that in all the above constructions there is in each link a rigid eye with a rigid permanently-open hook and an intermediate member of a pivotal connection, by means of which connection there is attached a movable hook, which swings in a plane perpendicular to the above-mentioned plane of the rigid hook, so that there can be practically no sidewise movement of one hook relative to the other hook, and as the eyes fit quite closely the outer surfaces of the hooks when in working position the hooks are supported much more firmly against being pulled out of shape than they would be if the eyes did not fit closely or if there could be a sidewise movement of one hook relative to the other, and it is obvious that this advantage is necessarily incident to my construction whether one or both hooks are movable relative to the eye so long as the swing is in a plane perpendicular to the above-mentioned plane, instead of swinging sidewise, as is done, for instance, in patent to Greuzbar, No. 63,996.

There are many features of construction which are common to all the forms of link shown. For instance, each has at one end an eye provided with one or more reduced portions or notches. Each has at its opposite end a hook which is movable about a pivot relatively to the said eye or loop to facilitate coupling and uncoupling the links. Each has two parts, of which one is first formed, the other being afterward cast thereon, except that in Fig. 6 the movable hook is connected with the other member of the link by a separately-formed pivot; but that hook is cast separately from the other member of the link. All are detachable, but only when placed in certain positions relative to each other. All are provided with two hooks, of which one lies flat upon the other, the point of one of each pair lying upon the body of the other, with interlocking devices upon their overlapping faces and mutually supporting each other against being pulled out of their original form.

What I claim is—

1. A drive-chain link having at one end an eye or loop, a hook at the opposite end; and a hook which swings in a direction perpendicular to the plane of the first-named hook; both hooks being adapted to engage with the eye of another link; substantially as set forth.

2. A drive-chain link having at one end an eye or loop, a rigid hook at the opposite end, one member of a pivotal connection between the hook and the eye; and a movable hook pivoted in the seat, substantially as set forth.

3. A drive-chain link having at one end an eye or loop, at the other end a hook, and a hook which is adapted to swing in a direction perpendicular to the plane of the first-named hook, the hooks being provided with interlocking parts, substantially as set forth.

4. A drive-chain link having at one end an eye or loop, an attached hook at the other end, with an intermediate member of a pivotal connection having cone-shaped inner faces; and a movable hook cast thereon with its body fitting closely the cone-shaped parts, substantially as set forth.

5. A drive-chain link having at one end an eye or loop and a member of a pivotal connection which is integral therewith, and having a notch or reduced portion; and a movable hook provided with a lip which is adapted to pass through the notch and into the eye of an adjacent link, substantially as set forth.

6. A drive-chain link having at one end an eye or loop, and a hook at its opposite end; and a movable hook disposed to swing in a plane perpendicular to the plane of the first-named hook; the point of each hook lying adjacent to the body of the other hook of the pair, substantially as set forth.

In testimony whereof I affix my signature in presence of two witnesses.

CHRISTOPHER W. LEVALLEY.

Witnesses:
L. B. BALL,
JOSEPH LOCH.